Patented Nov. 28, 1933

1,936,585

UNITED STATES PATENT OFFICE 1,936,585

MANUFACTURE OF CELLULOSE ESTERS

Henry Dreyfus, London, England

No Drawing. Application October 31, 1927, Serial No. 230,169, and in Great Britain September 28, 1927

12 Claims. (Cl. 260—108)

This invention relates to a new or improved process for the manufacture of cellulose acetates and cellulose esters of higher homologues of acetic acid, such for example as propionic acid, butyric acid.

According to the present invention, cellulose esters are produced by subjecting cellulosic materials, with or without pretreatment with organic acids, particularly lower fatty acids such as formic or acetic acid, to esterification by means of fatty acid anhydrides, particularly acetic anhydride, the esterification being carried out in presence of a condensing agent or catalyst comprising one or more hydrohalic acids, particularly hydrochloric acid, and a halide salt or salts, particularly chlorides, of one or more of metals intermediate between chromium and zinc in the first long period of the periodic classification, viz metals having an atomic weight between 53 and 65, namely, manganese, iron, cobalt, nickel and copper, the hydrohalic acid being used in a total quantity of not less than 2%, calculated on the weight of the cellulose, and the halide (inclusive of the zinc halide if used) being also used in a total quantity of not less than 2% calculated on the cellulose.

Advantageously the total hydrohalic acid and the total halide may be each employed in a quantity of between 5% and 20% calculated on the cellulose.

As the result of research I have found that very valuable clear esterification solutions of cellulose acetates or other cellulose esters are obtainable without serious degradation of the cellulose molecule by employing hydrochloric acid in proportions of not less than 2% (reckoned as HCl) on the weight of the cellulose, in association with ferric chloride or chlorides of others of the aforesaid metals, and that the amount of the metal chloride may be reduced to a minimum of 2% on the weight of the cellulose. Excellent results are also obtainable when the esterification is carried out so that the ester produced does not go into solution. With these minimum quantities of hydrochloric acid and chloride the acetylation or other esterification takes a considerable time when conducted at temperatures which do not bring about serious degradation of the cellulose, and from the point of view of accelerating the reaction and decreasing the time it is better to increase the quantity of the ferric chloride or other metal chloride and the quantity of hydrochloric acid to amounts of from 5% upwards, calculated on the cellulose or where hydrochloric acid in quantities approaching the minimum is used, to increase the quantity of the chloride to over 5%, for example 10% or more. The best results appear to be obtained when both the chloride and the hydrochloric acid are present in proportions of 5% to 10%, for instance 10% of ferric chloride with 10% of hydrochloric acid or 10% of ferric chloride with 5% of hydrochloric acid. The quantity of the chloride may be increased to 20%, 30% 50% or more, but it is preferable not to increase it beyond 50%. Larger quantities than 10% of hydrochloric acid may of course be used.

The chlorides of the aforesaid metals may be wholly or partly replaced by the corresponding bromides or iodides or mixtures thereof; and/or the hydrochloric acid may be wholly or partly replaced by hydrobromic acid or hydriodic acid or mixtures thereof.

Any cellulosic materials may be used as initial materials for the acetylation or esterification, for example, cotton or other celluloses or near conversion products thereof may be employed, or wood pulps, such as sulphite pulp, soda pulp, sulphate pulp or mechanical wood pulps from which the lignin, pentosan, resin and like constituents have been substantially removed.

In order to obtain the best results the cellulosic materials may be pretreated with organic acids, and particularly with lower fatty acids such as formic and acetic acid, to increase their reactivity. In the case of wood pulps such as referred to, from which the lignin, pentosan, resin and like constituents have been substantially removed, these are preferably subjected to an alkaline purifying treatment.

The pretreatment of the cellulosic materials with organic acids may be carried out in any suitable manner. Thus, for example, they may be pretreated with the concentrated or dilute acids, particularly formic or acetic acid in the form of vapors, the vapors being employed alone or mixed with air or other inert gas and being applied as such or being generated by first soaking the cellulosic material in dilute or concentrated solutions of the acids and then blowing or sucking air or other inert gas over or through the material. After the treatment with organic acids, the cellulosic materials may be subjected to a stream of air or inert gas or to suction or vacuum to remove the organic acids wholly or partially. Formic acid, except when employed only in small quantities, should be substantially removed, as it reacts with acetic anhydride.

In order to avoid degradation of the cellulose molecule the acetylation or other esterification is preferably carried out at temperatures not exceeding 50° C., and preferably at about ordinary temperature or with cooling so as to remain at about ordinary temperature or with cooling down to temperatures such as 5° to 0° C. or lower. With different catalysts different temperatures are required, for example cupric and cuprous chlorides require raised temperatures.

The halide salts may be employed as such, or may be formed in situ. For example ferric oxide may be used and on addition of hydrochloric acid form the required ferric chloride. The hydrochloric acid or other hydrohalic acid may be applied in any suitable form, either in solution or as a gas, and may be introduced after the reaction has been started with the ferric chloride or other halide salt, for instance it may be introduced all at once, or in portions at intervals, or continuously during the reaction, but preferably the combined condensing agents or catalysts are allowed to exert their joint action from the commencement of the esterification, i. e. they are both incorporated in the esterifying mixture before the addition of the cellulose or they are both present together with the cellulose before the introduction of the anhydride. The ferric chloride or other halide salt may, if desired, be incorporated in the cellulosic material prior to the acetylation or esterification.

The esterification may be performed in presence of a solvent for the cellulose ester produced; acetic acid is particularly suitable in the case of manufacturing cellulose acetates but any other suitable solvents (or solvent mixtures) of the cellulose acetates or other cellulose esters may be employed. The acetic acid or equivalent solvent or solvent mixture may be present in any desired quantity, such as 4 to 6 times the weight of the cellulose or near conversion product, but cellulose acetates or other cellulose esters of specially high viscosity can be obtained if the acetic acid or equivalent solvent or solvent mixture is present in an amount greater than six times, for example 8 to 20 times or more the weight of the cellulose or conversion product as hereinafter referred to. Small quantities,—such for instance as ½ to 10% reckoned on the weight of the cellulose,—of more powerful organic solvents for cellulose acetates or the other cellulose esters, such for example as ethylidene diacetate, lactic acid or its acetyl derivatives, may be added to the acetic acid or other solvent or solvent mixture.

Cellulose acetates of specially high viscosity characteristics can be obtained by conducting the acetylation in presence of acetic acid or equivalent solvents or solvent mixtures in an amount greater than six times, for example 8 to 20 times or more, the weight of the cellulose or cellulose conversion product used. With the present invention likewise the acetylation or esterification may with advantage, for the production of very highly viscous cellulose acetates or other cellulose esters, be conducted in presence of similar large amounts of acetic acid or equivalent solvents or solvent mixtures, for example other higher fatty acids than acetic acid, or other suitable acids, or liquids such as chloroform, tetrachlorethane, or mixtures of such solvents or liquids.

Alternatively the acetylation or esterification may be performed in suspension in liquid diluents, such for example as benzene or toluene. The esterification in suspension may, for instance, be conducted on the lines indicated in my French Patent No. 432,046 and its patents of addition Nos. 15,933 and 16,316. If desired, solvents, for example acetic acid, may be present in addition to the liquid diluents. Furthermore acetic acid or equivalent solvent may again be used in quantities over six times the weight of the cellulose, for example 8–20 times or more, to obtain cellulose esters of high viscosity. In all such cases of using solvents in addition to liquid diluents, the liquid diluent should be present in sufficient quantity to prevent solution of the cellulose acetate or other cellulose ester produced.

As a further modification the esterification may be conducted substantially in absence of liquid solvents or diluents by employing vapours of acetic anhydride or other esterifying agent.

Fibres, fabrics or the like may be acetylated or esterified by means of the present invention by carrying out the esterification either in suspension in presence of liquid diluents or substantially in absence of liquid solvents or diluents.

The primary esters produced by the present process are capable of yielding secondary acetone-soluble cellulose esters of very high content, for example, secondary cellulose acetates are obtained which are soluble in acetone and have an acetyl value of 56 to 57% as compared with a 52% content of the ordinary commercial acetone-soluble cellulose acetate. Moreover artificial silks produced from these secondary cellulose acetates resist the delustering action of high or boiling aqueous liquids or moist steam to a very high degree.

The following examples illustrate the invention but are not to be construed as in any way limiting it.

Example 1

100 parts of cotton cellulose are pretreated with formic acid, for example by treatment with 500 to 1000 parts or more of formic acid of about 85% strength, allowing to stand for some hours in the cold and hydro-extracting or by impregnating with about 15 parts of formic acid of 75–85% strength and then allowing to stand for about 8–12 hours at ordinary temperature. If desired the material may then be washed to remove the formic acid and centrifuged or dried. The 100 parts of pretreated material are introduced in the acetylator into a mixture of 600 parts of acetic anhydride, 600 parts of acetic acid, 10 parts of ferric chloride and 10 parts of hydrochloric acid (calculated as HCl) either in the form of the fuming aqueous solution (35% strength) or in solution in the acetic acid, and the mass is constantly mixed or stirred during the reaction, which is conducted at about ordinary atmospheric temperature. The acetylation proceeds smoothly and complete acetylation takes place in about 6–30 hours, a clear solution being obtained. The solution may either be used directly or the cellulose acetate may be precipitated and redissolved or worked up in any desired manner.

With the same proportions of pretreated cellulose, acetic anhydride and acetic acid and under the same temperature conditions, complete solution takes place in about 4–15 hours with 50% of ferric chloride and 10% of HCl; in about 8–32 hours with 10% of ferric chloride and 5% of HCl. Instead of ferric chloride one may use mixtures of ferrous and ferric chlorides.

Example 2

100 parts of cotton cellulose pretreated as in Example 1 are introduced in the acetylator into a mixture of 800 parts of acetic acid, 300 parts of acetic anhydride, 50 parts of ferric chloride and 10 parts of hydrochloric acid (calculated as HCl) either in aqueous solution (e. g. 35% strength) or in solution in the acetic acid. The reaction is carried out in the cold with constant mixing or stirring. In about 4 to 15 hours a clear solution is obtained of a cellulose acetate of very high viscosity. Instead of ferric chloride one may use mixtures of ferrous and ferric chlorides.

*Example 3*

100 parts of cotton cellulose are introduced in the acetylator into about 800 parts of glacial acetic acid and the whole heated up to 80° C. and maintained at 80°–100° C. for about 12 hours. The contents of the acetylator are then cooled or allowed to cool to about 20° C. and 10 parts of ferric chloride and 10 parts of hydrochloric acid (calculated as HCl) either as 35% aqueous solution or in acetic acid solution are added, and finally 1500 parts of benzene mixed with 300 parts of acetic anhydride are introduced. The reaction is conducted at about 15°–40° C. preferably with constant mixing or stirring of the mass, and takes about 6–24 hours.

*Example 4*

100 parts of cotton cellulose are introduced in the acetylator into a mixture of 800–1000 parts of acetic acid, 400 parts of acetic anhydride, 20 parts of ferric chloride and 10 parts of hydrochloric acid (calculated as HCl) either in the form of aqueous solution (e. g. 35%) or in solution in the acetic acid, the reaction being then conducted in the cold with constant stirring or mixing. After about 12–24 hours a solution is obtained of a cellulose acetate of high viscosity.

The cellulose acetates or other cellulose esters resulting from acetylation or other esterification according to the invention may be used in their esterification solutions or in solutions of the primary esterification products for the production of artificial silks, films etc., or they may be subjected to secondary treatments or reactions for the purpose of changing their solubilities. The secondary treatments or reactions may be carried out in the primary esterification solutions or suspensions, preferably without neutralizing the hydrochloric or other hydrohalic acid present and preferably without eliminating the ferric chloride or other halide salt used and after destroying if necessary any remaining anhydride by the addition of water or other anhydride-destroying agents, (such for instance as hydroxy derivatives, oxy acids, for instance lactic acid, alcohols etc.). Alternatively the esters, either precipitated from the primary esterification solutions or those obtained other than in solution, may be dissolved or suspended and then subjected to the secondary treatments. The secondary treatments or reactions may be carried out with or without addition of inorganic or organic acids, acid salts or other suitable agents for promoting the secondary treatment or reaction, the treatment in any case being stopped when the required solubility has been reached. It is particularly advantageous to conduct the further treatments or reactions in the joint presence of hydrochloric acid and ferric chloride or other combined catalysts used according to the present invention, either in the primitive esterification solutions or suspensions or after separation therefrom. For the further treatments or reactions one should first destroy any remaining acetic anhydride or other esterifying anhydride that may remain in the esterification solution or suspension or in the primary ester, by adding water or other anhydride-destroying agents to the esterification solution or to the solutions or suspensions of the primary ester.

While the secondary or further treatments of the primary esterification products may with advantage be conducted at ordinary or moderate temperatures, one may if desired quicken the reaction by heating up to relatively high or high temperatures, even up to 80° or 100° C., but in such cases the presence of free mineral acids is preferably avoided.

The secondary or further treatments of the primary esterification products will be stopped when the particular solubility desired is reached.

An important advantage of the present invention is the fact that the cellulose acetates or other esters can be employed in their primary esterification solutions in their different stages or phases of acetylation, for the production of artificial silks and the like, films, celluloid-substitutes or other thermoplastic masses or articles, etc.

Further the invention permits of obtaining cellulose esters of high quality which are soluble in acetone or in very low boiling solvents, for instance methyl formate, acetaldehyde, formaldehyde, etc. Also suitable high boiling solvents or plasticizing or softening agents can be readily incorporated with them or their solutions in volatile solvents and/or very low boiling solvents.

The cellulose acetate or other cellulose esters may be employed in their primary esterification solutions for the production of artificial silks, films, etc. or they may be employed for such purposes, either as primary esters or after having been subjected to secondary treatments, in solution in suitable solvents, for example acetone or the very low boiling solvents specified above, particularly for dry-spinning processes of producing artificial silks. For such purposes moreover, and for the production of thermoplastic masses and articles and the like, plasticizing or softening agents or high boiling solvents may be incorporated in the esters or in their solutions.

In the appended claims phrases indicating a certain quantity of hydrohalic acid are to be read as meaning that quantity of hydrochloric acid or of hydrobromic acid or of hydriodic acid or that quantity of a mixture of any two or more of these acids and similarly phrases indicating a certain quantity of a halide of a metal of atomic weight between 53 and 65 are to be read as meaning that quantity of chloride, bromide or iodide of manganese, iron, cobalt, nickel, or copper or that quantity of a mixture of any two or more of these halides.

What I claim and desire to secure by Letters Patent is:—

1. Process for the production of cellulose esters, comprising esterifying cellulose by means of fatty acid anhydrides in presence of at least 2% (calculated on the weight of the cellulose) of hydrohalide acid and at least 2% of a halide of a metal having an atomic weight between 53 and 65.

2. Process for the production of cellulose esters comprising esterifying cellulose by means of fatty acid anhydrides in presence of at least 2% (calculated on the weight of the cellulose) of hydrochloric acid and at least 2% of a chloride of a metal having an atomic weight between 53 and 65.

3. Process for the production of cellulose esters comprising treating cellulose with a lower aliphatic carboxylic acid and thereafter esterifying by means of fatty acid anhydrides in presence of at least 5% (calculated on the weight of the cellulose) of hydrochloric acid and at least 5% of a chloride of a metal having an atomic weight between 53 and 65.

4. Process for the production of cellulose acetate, comprising treating cellulose with lower fatty acids and thereafter esterifying at temperatures up to 50° C. by means of acetic anhydride in presence of at least 5% (calculated on the weight of the cellulose) of hydrochloric acid and at least 5% of a chloride of a metal having an atomic weight between 53 and 65 and in presence of a solvent for the acetate produced.

5. Process for the production of cellulose acetate, comprising treating cellulose with formic acid and thereafter esterifying at temperatures up to 50° C. by means of acetic anhydride in presence of at least 5% (calculated on the weight of the cellulose) of hydrochloric acid and at least 5% of a chloride of a metal having an atomic weight between 53 and 65 and in presence of a solvent for the acetate produced.

6. Process for the production of cellulose acetate, comprising treating cellulose with lower fatty acids and thereafter esterifying at temperatures up to 50° C. by means of acetic anhydride in presence of at least 5% (calculated on the weight of the cellulose) of hydrochloric acid and at least 5% of a chloride of a metal having an atomic weight between 53 and 65 and in presence of a solvent for the acetate produced in quantity at least six times the weight of the cellulose.

7. Process for the production of cellulose acetate, comprising treating wood pulps with alkaline purifying agents, then with lower fatty acids and thereafter esterifying at temperatures up to 50° C. by means of acetic anhydride in presence of at least 5% (calculated on the weight of the cellulose) of hydrochloric acid and at least 5% of a chloride of a metal having an atomic weight between 53 and 65 and in presence of a solvent for the acetate produced.

8. Process for the production of cellulose acetate, comprising treating cellulose with lower fatty acids and thereafter esterifying at temperatures up to 50° C. by means of acetic anhydride in presence of 5%–10% (calculated on the weight of the cellulose) of hydrochloric acid and 5%–10% of ferric chloride and in presence of a solvent for the acetate produced.

9. Process for the production of cellulose acetate, comprising treating cellulose with lower fatty acids and thereafter esterifying at temperatures up to 50° C. by means of acetic anhydride in presence of at least 5% (calculated on the weight of the cellulose) of hydrochloric acid and at least 5% of a chloride of a metal having an atomic weight between 53 and 65 and then subjecting the acetate produced to treatment with hydrochloric acid and manganese-copper group metallic chloride for the purpose of changing its solubilities.

10. Process for the production of cellulose esters comprising esterifying cellulose by means of fatty acid anhydrides in the presence of at least 2% (calculated on the weight of the cellulose) of hydrohalide acid and at least 2% of ferric halide.

11. Process for the production of cellulose esters comprising esterifying cellulose by means of fatty acid anhydrides in the presence of at least 5% (calculated on the weight of the cellulose) of hydrohalide acid and at least 5% of ferric halide.

12. Process for the production of cellulose esters, comprising esterifying cellulose by means of fatty acid anhydrides in the presence of at least 5% (calculated on the weight of the cellulose) of hydrochloric acid and at least 5% of ferric chloride.

HENRY DREYFUS.